(12) United States Patent
Akella et al.

(10) Patent No.: US 11,494,720 B2
(45) Date of Patent: Nov. 8, 2022

(54) AUTOMATIC CONTRACT RISK ASSESSMENT BASED ON SENTENCE LEVEL RISK CRITERION USING MACHINE LEARNING

(71) Applicant: International Business Machines Corporation, Armonk, NY (US)

(72) Inventors: Raji Lakshmi Akella, Austin, TX (US); Xuan-Hong Dang, Chappaqua, NY (US); Syed Yousaf Shah, Yorktown Heights, NY (US); Petros Zerfos, New York, NY (US); Milton Orlando Laverde Echeverria, Danbury, CT (US); Ashley Potter, Wilmington, NC (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/917,276

(22) Filed: Jun. 30, 2020

(65) Prior Publication Data

US 2021/0406788 A1    Dec. 30, 2021

(51) Int. Cl.
*G06Q 10/06* (2012.01)
*G06Q 50/18* (2012.01)
(Continued)

(52) U.S. Cl.
CPC ......... *G06Q 10/0635* (2013.01); *G06F 9/547* (2013.01); *G06F 40/20* (2020.01);
(Continued)

(58) Field of Classification Search
CPC ........ G06F 40/289; G06F 40/40; G06F 16/93; G06F 40/20; G06F 40/205; G06N 20/00; G06Q 50/18; G06Q 10/00
See application file for complete search history.

(56) References Cited

U.S. PATENT DOCUMENTS 8,180,713 B1 *  5/2012  Rigby ............. G06Q 40/08
                                                706/12
8,781,815 B1 *  7/2014  Gidney ........... G06F 40/289
                                                704/4

(Continued)

FOREIGN PATENT DOCUMENTS

CN         110147981 A       8/2019

OTHER PUBLICATIONS

Tolpygo, Alexander, Eliminating Manual Contract & Review with Natural Language Processing Medium.com, Jul. 14, 2019 (Year: 2019).*

(Continued)

*Primary Examiner* — Scott L Jarrett

(74) *Attorney, Agent, or Firm* — Patterson + Sheridan, LLP

(57) ABSTRACT

Techniques are provided for the automated risk assessment of a document. In one embodiment, the techniques involve mapping, via a risk assessment engine, one or more sentences in a first document to one or more risk categories, identifying, via a classification engine, risk-associated language of the one or more sentences based on the one or more risk categories, mapping, via a risk assessment engine, the risk-associated language of the one or more sentences to one or more risk criterion of a risk criterion document, and generating, via a risk assessment engine, a first risk assessment based on the one or more risk criterion of the risk criterion document.

14 Claims, 7 Drawing Sheets

(51) Int. Cl.
*G06N 20/00* (2019.01)
*G06N 5/04* (2006.01)
*G06Q 10/10* (2012.01)
*G06F 9/54* (2006.01)
*G06F 40/20* (2020.01)

(52) U.S. Cl.
CPC .............. *G06N 5/04* (2013.01); *G06N 20/00* (2019.01); *G06Q 10/10* (2013.01); *G06Q 50/18* (2013.01)

(56) References Cited

U.S. PATENT DOCUMENTS

| | | | |
|---|---|---|---|
| 9,268,768 B2* | 2/2016 | Gidney | G06F 40/30 |
| 9,514,499 B1* | 12/2016 | Kogut-O'Connell | G06Q 10/10 |
| 9,754,206 B1* | 9/2017 | Brestoff | G06Q 10/10 |
| 9,754,219 B1* | 9/2017 | Brestoff | G06Q 10/0635 |
| 9,996,528 B2* | 6/2018 | Gidney | G06F 40/30 |
| 10,146,769 B2* | 12/2018 | Chen | G06F 40/30 |
| 10,185,712 B2* | 1/2019 | Gidney | G06F 40/289 |
| 10,726,374 B1* | 7/2020 | Engineer | G06F 40/30 |
| 10,867,268 B1* | 12/2020 | Kumar | G06F 40/30 |
| 11,132,748 B2* | 9/2021 | Leidner | G06Q 10/0635 |
| 11,157,972 B2* | 10/2021 | Awoyemi | G06Q 30/0282 |
| 11,164,270 B2* | 11/2021 | Guo | G06Q 10/0635 |
| 11,205,233 B1* | 12/2021 | Callahan | G06F 16/9558 |
| 11,348,352 B2* | 5/2022 | Makhija | G06F 16/258 |
| 2003/0125965 A1* | 7/2003 | Falso | G06Q 40/08 705/317 |
| 2003/0177083 A1* | 9/2003 | Mont | G06Q 40/06 705/36 R |
| 2008/0183459 A1* | 7/2008 | Simonsen | G06F 40/58 704/1 |
| 2008/0306784 A1* | 12/2008 | Rajkumar | G06Q 50/18 705/342 |
| 2008/0306894 A1* | 12/2008 | Rajkumar | G06Q 10/0637 706/47 |
| 2012/0226519 A1* | 9/2012 | Copeland | G06Q 10/0635 705/7.28 |
| 2013/0325678 A1* | 12/2013 | Cheng | G06Q 30/02 705/35 |
| 2014/0053069 A1* | 2/2014 | Yan | G06Q 10/0635 715/259 |
| 2014/0114962 A1* | 4/2014 | Rosenburg | G06F 16/2425 707/723 |
| 2014/0172417 A1* | 6/2014 | Monk, II | G06F 40/30 704/9 |
| 2015/0106276 A1* | 4/2015 | Clark | G06Q 50/18 705/311 |
| 2015/0106378 A1* | 4/2015 | Clark | G06F 16/353 707/740 |
| 2015/0106385 A1* | 4/2015 | Clark | G06F 40/169 707/748 |
| 2015/0161102 A1* | 6/2015 | Gidney | G06F 40/289 704/9 |
| 2016/0103823 A1* | 4/2016 | Jackson, Jr. | G06N 5/025 704/9 |
| 2017/0017641 A1* | 1/2017 | Gidney | G06F 40/30 |
| 2017/0277856 A1* | 9/2017 | De La Torre | G06F 16/9024 |
| 2018/0053128 A1* | 2/2018 | Costas | G06Q 50/18 |
| 2018/0129989 A1 | 5/2018 | Bowers | |
| 2018/0268506 A1* | 9/2018 | Wodetzki | G06V 30/413 |
| 2019/0138571 A1* | 5/2019 | Dimerman | G06F 16/2477 |
| 2019/0156256 A1* | 5/2019 | Argyros | G06F 40/216 |
| 2019/0347284 A1* | 11/2019 | Roman | G06F 40/194 |
| 2020/0226510 A1* | 7/2020 | Gupta | G06Q 50/18 |
| 2020/0327172 A1* | 10/2020 | Coquard | G06V 30/416 |
| 2021/0200962 A1* | 7/2021 | Feng | G06F 40/284 |
| 2021/0201013 A1* | 7/2021 | Makhija | G06V 30/414 |
| 2021/0256115 A1* | 8/2021 | Shashanka | G06F 40/279 |
| 2021/0273950 A1* | 9/2021 | Lawson | G06K 9/6256 |
| 2021/0382948 A1* | 12/2021 | Bastide | G06F 40/30 |

OTHER PUBLICATIONS

Waisberg, Noah, Non-Standard Contract Clause Detection is Easy to Build, Hard to Get Right KiraSystems.com, 2014 (Year: 2014).*

Robinson, Braden et al., Ultria Stand Alone AI: Power Your Contract Migration and Data Extraction Ultria, Apr. 3, 2020 (Year: 2020).*

Hicks, Debra, Non-Standard Contract Clauses—Can You Afford to Ignore Them? Alberta Construction Association, 2018 (Year: 2018).*

Ultria Protector—Covid 19—data sheet Ultria, Apr. 2020 (Year: 2020).*

Eastwood, Brian, AI-enabled Klarity helps companies identify risks in contracts MIT Sloan, Nov. 2, 2017 (Year: 2017).*

Chakrabarti, Dipankar et al., Use of Artificial Intelligence to Analyze Risk in Legal Documents for a Better Decision Support Proceedings of TENCON2018, IEEE, Oct. 2018 (Year: 2018).*

Wiggers, Kyle, Evisort raises $15 million to automate contract creation and management VentureBeat.com, Dec. 19, 2019 (Year: 2019).* http://www.brightleaf.com/automated-contract-abstraction/ Brightleaf Solutions [ Accessed on: Feb. 28, 2020] "Automated Contrast Abstraction".

"Contract Analysis" | "Kira Systems" [Accessed on: Feb. 28, 2020] https://kirasystems.com/how-it-works/contract-analysis/.

EBrevia, "Contract Analyzer," [Accessed on: Feb. 28, 2020] https://ebrevia.com/ebrevia-contract-manager.

COLIEE-2018: Evaluation of the Competition on Legal Information Extraction and Entailment, K. Kojima et al. (Eds.): JSAI-isAI 2018 Workshops, LNAI 11717, pp. 177-192, 2019. [Abstract Only] https://doi.org/10.1007/978-3-030-31605-1_14.

Juliano Rabelo, Mi-Young Kim, Randy Goebel, "Combining Similarity and Transformer Methods for Case Law Entailment." ICAIL 2019, pp. 7.

Ayaka Morimoto, Daiki Kubo, Motoki Sato, Hiroyuki Shindo and Yuji Matsumoto, "Legal Question Answering System using Neural Attention," EPiC Series in Computing, vol. 47, 2017, pp. 79-89.

IBM Watson—Compare and Comply, viewed Jun. 30, 2020 https://www.ibm.com/cloud/compare-and-comply.

Xuan-Hong Dang, Raji Akella, Somaieh Bahrami, Vadim Sheinin, Petros Zerfos "Unsupervised Threshold Autoencoder to Analyze and Understand Sentence Elements", IEEE Big Data 2018— [Abstract Only] https://ieeexplore.ieee.org/document/8622379.

* cited by examiner

AUTOMATIC CONTRACT RISK ASSESSMENT BASED ON SENTENCE LEVEL RISK CRITERION USING MACHINE LEARNING

BACKGROUND

The present disclosure relates to automatic risk assessment, and more specifically, to using machine learning techniques to automatically generate risk assessments for one or more documents.

Traditional processes for assessing the risks posed to parties to documents typically involve a person reading and analyzing the documents, while employing their particular expertise, work rate, and style of analysis. Such processes can be tedious, and lend themselves to human errors, such as inaccuracies and inconsistencies, in assessing the risks of the documents. The inaccuracies and inconsistencies can be compounded due to the documents being analyzed by different persons, attributable to each individual's unique skillset. Hence traditional processes for risk assessment may not produce a consistent, accurate, and precise risk assessment for the documents.

Another issue of traditional processes for assessing the risks posed to parties to documents is relatively slow turnaround times due to the speed of human reading and analysis of the documents. This issue can cause major delays and large losses of revenue in business settings, where there can be periods during which the risks must be assessed for a large number of documents (e.g., during the end of a fiscal quarter, or during the finalization of a merger or acquisition). Further, time constrictions associated with these scenarios can further compound the inaccuracies and inconsistencies in assessing the risks of the documents. Hence traditional processes for risk assessment may not produce timely, consistent, accurate, and precise risk assessment for the documents.

Further, analysis of the risks posed by the documents typically requires that the person performing the risk assessment is an expert in the subject material of the documents. For example, a contract attorney may be best suited to determine the risks present in a contract. This requirement can impose relatively high costs for the risk assessment process, particularly when the risks of a large volume of documents must be determined.

SUMMARY

A method is provided according to one embodiment of the present disclosure. The method comprises mapping, via a risk assessment engine, one or more sentences in a first document to one or more risk categories associated with a type of risk posed by the first document; identifying, via a classification engine, risk-associated language of the one or more sentences based on the one or more risk categories; mapping, via the risk assessment engine, the risk-associated language of the one or more sentences to one or more risk criterion of a risk criterion document; and generating, via the risk assessment engine, a first risk assessment based on the one or more risk criterion of the risk criterion document. Advantageously, this enables an accurate, automated, consistent, precise, and relatively quick risk assessment of the first document.

According to another embodiment of the present disclosure, the one or more risk categories are based on the risk criterion document. Advantageously, this enables the risk categories to be easily changed or updated by adding, changing, swapping, or updating a risk criterion document. Further, use of the risk criterion document enables experts in the subject matter of the first document to preset risk criterion that can be used to identify risks of the first document, thereby focusing the risk assessment on risks that are likely to be pertinent to the parties of the first document.

According to another embodiment of the present disclosure, the risk-associated language comprises non-standard language of the first document. Advantageously, this enables the risk assessment engine to identify language that can pose a risk to parties of the first document.

According to another embodiment of the present disclosure, the method further comprises: determining that the first risk assessment is indeterminate of risk; combining data from at least one of i) language in the first document excluding the one or more sentences, and ii) storage elements comprising information not included in the first document; and generating a second risk assessment based on the data. Advantageously, this enables the risk assessment engine to consider additional data in the first document, as well as alternate sources of data, and to better assess the risk posed by the first document.

According to another embodiment of the present disclosure, the data is combined based on metadata associated with the risk criterion document. Advantageously, this enables the risk assessment engine to determine when a risk criterion has or has not been satisfied, thereby enabling the risk assessment engine to determine when to search for additional information to determine the risk of the first document.

According to another embodiment of the present disclosure, the method further comprises determining at least one of i) the first risk assessment indicates presence of a risk in the document, ii) the second risk assessment indicates presence of a risk in the document, and iii) the second risk assessment is indeterminate of risk, and dispatching the first document and the first or second risk assessment to a computer or device. Advantageously, this enables the risk assessment engine to ensure that any document that poses a risk, or may pose a risk, to a party of the document is delivered to a computer or device for review or further risk assessment.

A system is provided according to one embodiment of the present disclosure. The system comprises a risk assessment engine configured to: map one or more sentences in a first document to one or more risk categories associated with a type of risk posed by the first document; identify risk-associated language of the one or more sentences based on the one or more risk categories; map the risk-associated language of the one or more sentences to one or more risk criterion of a risk criterion document; and generate a first risk assessment based on the one or more risk criterion of the risk criterion document. Advantageously, this enables an accurate, automated, consistent, precise, and relatively quick risk assessment of at least the first document.

According to another embodiment of the present disclosure, the one or more risk categories are based on the risk criterion document. Advantageously, this enables the risk categories to be easily changed or updated by adding, changing, swapping, or updating a risk criterion document. Further, use of the risk criterion document enables experts in the subject matter of the first document to preset risk criterion that can be used to identify risks of the first document, thereby focusing the risk assessment on risks that are likely to be pertinent to the parties of the first document.

According to another embodiment of the present disclosure, the risk-associated language comprises non-standard language of the first document. Advantageously, this enables the risk assessment engine to identify language that can pose a risk to parties of the first document.

According to another embodiment of the present disclosure, the risk assessment engine is further configured to: determine that the first risk assessment is indeterminate of risk; combine data from at least one of i) language in the first document excluding the one or more sentences, and ii) storage elements comprising information not included in the first document; and generate a second risk assessment based on the data. Advantageously, this enables the risk assessment engine to consider additional data in the first document, as well as alternate sources of data, and to better assess the risk posed by the first document.

According to another embodiment of the present disclosure, the data is combined based on metadata associated with the risk criterion document. Advantageously, this enables the risk assessment engine to determine when a risk criterion has or has not been satisfied, thereby enabling the risk assessment engine to determine when to search for additional information to determine the risk of the first document.

According to another embodiment of the present disclosure, the risk assessment engine is further configured to: determine at least one of one of i) the first risk assessment indicates presence of a risk in the document, ii) the second risk assessment indicates presence of a risk in the document, and iii) the second risk assessment is indeterminate of risk, and dispatch the first document and the first or second risk assessment to a computer or device. Advantageously, this enables the risk assessment engine to ensure that any document that poses a risk, or may pose a risk, to a party of the document is delivered to a computer or device for review or further risk assessment.

A computer-readable storage medium including computer program code that, when executed on one or more computer processors, performs an operation is provided according to one embodiment of the present disclosure. The operation is configured to: map one or more sentences in a first document to one or more risk categories associated with a type of risk posed by the first document, identify risk-associated language of the one or more sentences based on the one or more risk categories, map the risk-associated language of the one or more sentences to one or more risk criterion of a risk criterion document, and generate a first risk assessment based on the one or more risk criterion of the risk criterion document. Advantageously, this enables an accurate, automated, consistent, precise, and relatively quick risk assessment of at least the first document.

According to another embodiment of the present disclosure, the one or more risk categories are based on the risk criterion document. Advantageously, this enables the risk categories to be easily changed or updated by adding, changing, swapping, or updating a risk criterion document. Further, use of the risk criterion document enables experts in the subject matter of the first document to preset risk criterion that can be used to identify risks of the first document, thereby focusing the risk assessment on risks that are likely to be pertinent to the parties of the first document.

According to another embodiment of the present disclosure, the risk-associated language comprises non-standard language of the first document. Advantageously, this enables the operation to identify language that can pose a risk to parties of the first document.

According to another embodiment of the present disclosure, the operation is further configured to: determine that the first risk assessment is indeterminate of risk; combine data from at least one of i) language in the first document excluding the one or more sentences, and ii) storage elements comprising information not included in the first document; and generate a second risk assessment based on the data. Advantageously, this enables the operation to consider additional data in the first document, as well as alternate sources of data, and to better assess the risk posed by the first document.

According to another embodiment of the present disclosure, the operation is further configured to: determine at least one of one of i) the first risk assessment indicates presence of a risk in the document, ii) the second risk assessment indicates presence of a risk in the document, and iii) the second risk assessment is indeterminate of risk, and dispatch the first document and the first or second risk assessment to a computer or device.

Advantageously, this enables the risk assessment engine to ensure that any document that poses a risk, or may pose a risk, to a party of the document is delivered to a computer or device for review or further risk assessment.

DETAILED DESCRIPTION

Embodiments of the present disclosure are directed towards an automated risk assessment system that interprets and analyzes the risk posed to one or more parties to a document. Previously, this risk was only capable of being assessed by humans. One embodiment of the present disclosure can automatically process documents by identifying sentences in the documents that are relevant to risk categories, mapping these sentences to the risk categories, identifying risk-associated language in the sentences via a machine learning process, mapping the risk-associated language to risk criterion, searching for additional information to inform risk assessments based on metadata associated with the risk criterion, and generating risk assessments of the documents. Benefits of the automated risk assessment system include generating accurate, consistent, precise, and speedy risk assessment of the documents, while mitigating human errors associated with traditional risk assessment procedures.

In one embodiment, the automated risk assessment system can analyze text of the document to assess the risk associated with the text. When analysis of the text of the document is sufficient to adequately assess the risk of the document, the automated risk assessment system can generate a risk assessment indicating the presence or severity of the risk. When analysis of the text of the document is not sufficient to adequately assess the risk of the document, the automated risk assessment system can complete the risk analysis by accessing information from external sources to supplement the analysis of the text of the document. One benefit to incorporating information from external sources is that it enables the automated risk assessment system to perform robust risk analysis that is not limited to information in the document being analyzed.

Figure 1:
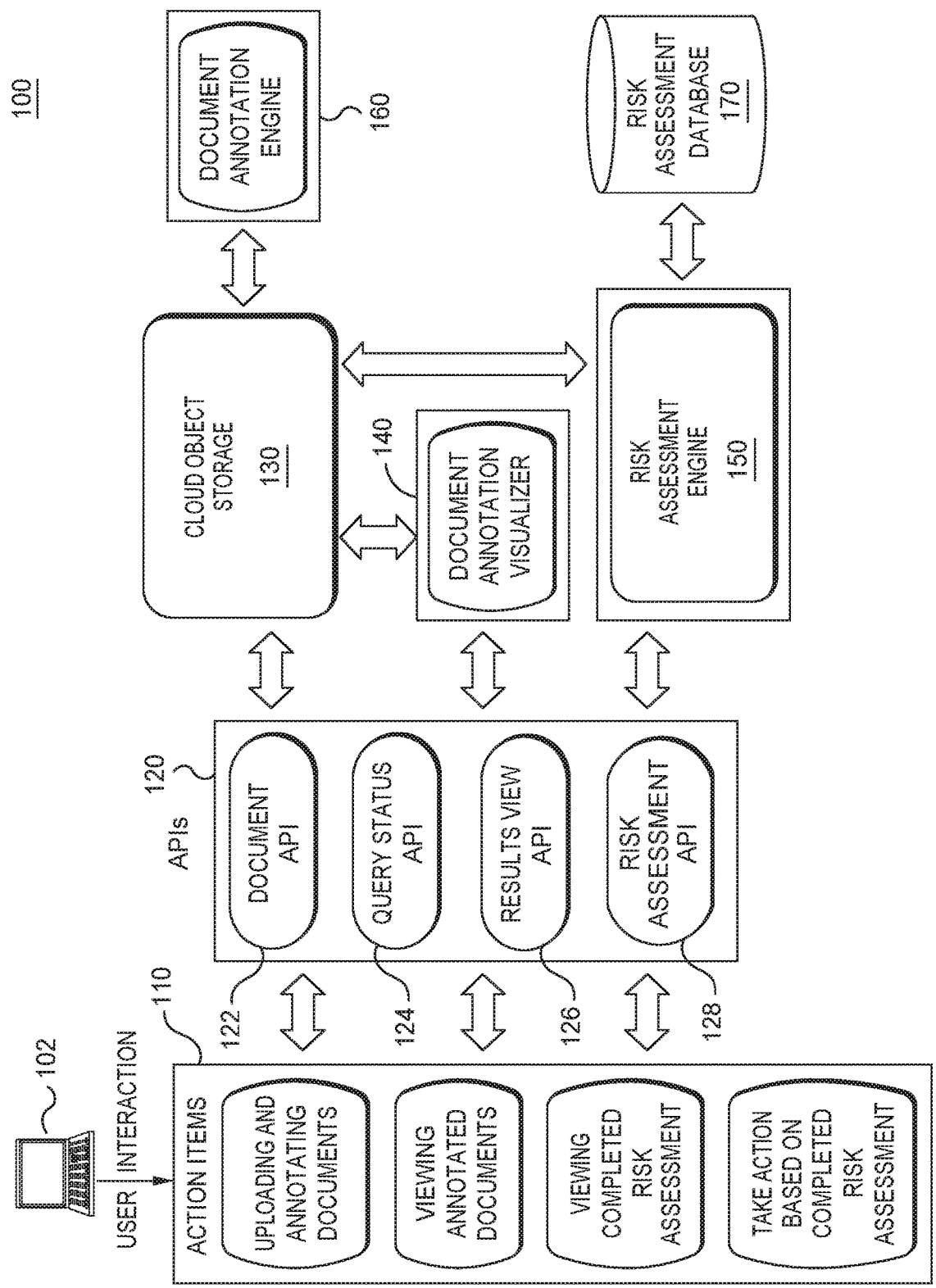
FIG. 1 illustrates a system for assessing the risk of a document, according to one embodiment.

FIG. 1 illustrates a system 100 for assessing the risk of a document, according to one embodiment. In the illustrated embodiment, the system 100 for assessing the risk of a document comprises a computer 102. The computer 102 can be connected to other computers (e.g. distributed databases, servers, or web-hosts) via a network (illustrated as bidirectional errors). The network comprises, for example, the Internet, a local area network, a wide area network, or a wireless network. The network can include any combination of physical transmission cables, optical transmission fibers, wireless transmission, routers, firewalls, switches, gateway computers and/or edge servers.

The computer 102 generally includes a processor that obtains instructions and data via a bus from a memory or storage. The computer 102 may also include one or more network interface connected to the bus. The computer 102 is generally under the control of an operating system suitable to perform the functions described herein. The processor is a programmable logic device that performs instruction, logic, and mathematical processing, and may be representative of one or more CPUs. The processor may execute one or more applications in memory. In at least one embodiment, the OS allocates each program executing on the computer 102 a respective runtime stack. The network interface may be any type of network communications device allowing the computer 102 to communicate with other computers via the network. The network interface may exchange data with the network. Furthermore, the computer 102 may be one or more servers operating as a part of a server cluster. For example, computer 102 may operate as an application server and may communicate with or in conjunction with other frontend, application, backend, data repository, or other type of server.

The memory or storage can be representative of hard-disk drives, solid state drives, flash memory devices, optical media, and the like. The memory or storage can also include structured storage, e.g. a database. In addition, the memory or storage may be considered to include memory physically located elsewhere; for example, on another computer coupled to the computer 102 via the bus or network.

As shown, the computer 102 can be used to perform action items 110. The action items 110 can include uploading and annotating documents, viewing annotated documents, viewing completed risk assessment information, and taking action based on a completed risk assessment.

Implementing one or more of the action items 110 includes transferring data across the network. In one embodiment, the data transfer is initiated by invoking one or more application programming interfaces (APIs) 120 that fully or partially comply with the representational state transfer (REST) architectural style.

Examples of the APIs 120 in the illustrated embodiment include a document API 122 comprising program functions to annotate and transfer documents across the network; a query status API 124 comprising program functions to determine when an annotation or transfer of documents is complete; a results view API 126 comprising program functions to view and manipulated annotated documents; and a risk assessment API 128 comprising program functions to determine the risk of the document borne by parties to the document.

In the illustrated embodiment, the system 100 for assessing the risk of a document further comprises a cloud object storage 130 connected to the network. The cloud object storage 130 can store data from any computer or device communicatively coupled to the network. Likewise, data stored in the cloud object storage 130 can be accessed by any computer connected to the network. For example, the computer 120 may invoke one or more of the APIs 120 to implement one or more of the action items 110. The cloud object storage 130 can be representative of hard-disk drives, solid state drives, flash memory devices, optical media, structured storage (e.g. a database), and the like. The cloud object storage 130 can also include memory physically located elsewhere; for example, on another computer coupled to the computer 102 via the bus or network. The cloud object storage 130 can also be representative of a software representation of data such as a linked list, data stored in eXtensible Markup Language (XML), or the like.

In the illustrated embodiment, the system 100 for assessing the risk of a document further comprises a risk assessment engine 150 connected to the network. The risk assessment engine 150 can be software executed on one or more processors. In one embodiment, when a user invokes the document API 122 to upload a document for risk assessment, the document is transferred to the cloud object storage 130 for storage, and then transferred to the risk assessment engine 150 for processing.

The risk assessment engine 150 can process the document by mapping one or more sentences in the document to one or more predetermined risk categories. One benefit to mapping the one or more sentences to the one or more predetermined risk categories is that it enables the risk assessment engine 150 to assess the risk of documents with large amounts of text, which would otherwise be difficult and computationally expensive to interpret and analyze.

Each predetermined risk category can be based on risk criterion from a risk criterion document. In one embodiment, the risk criterion is one or more questions associated with a risk posed to a party of the document uploaded for risk assessment. One benefit to implementing a risk criterion document is that it enables experts in the subject matter of the document to preset risk criterion that can be used to identify risks of the document, thereby focusing the risk assessment on risks that are likely to be pertinent to the parties of the document. One benefit to basing the risk criterion on a risk criterion document is that the risk categories can be easily changed or updated by adding, changing, swapping, or updating the risk criterion document.

In some embodiments, the risk assessment engine 150 determines when the one or more sentences that were mapped to a predetermined risk category include risk-associated language. Risk-associated language can be any language that involves risk posed to a party of the document. As a non-limiting example, if the document is a contract that includes non-standard language, this language may be risk-associated language. In comparison, the standard language, or boiler-plate language, of the contract is not associated with risk posed to a party to the contract.

After determining that mapped sentences include risk-associated language, the risk assessment engine 150 can implement a machine learning process to determine a risk posed to one or more parties of the document by the mapped sentences. One benefit to the risk assessment engine 150 implementing a machine learning process to determine the risk of the document is that it enables the risk assessment engine 150 to produce more accurate, consistent, precise, and speedy determinations of the risk, as compared to traditional solutions of risk assessment.

One way of determining the risk posed to a party involves classifying at least one element of the mapped sentences according to one or more of the risk criterion, and generating a corresponding one or more risk assessments. The risk assessments can be encapsulated as objects, or incorporated into objects, and stored with the mapped sentences in the cloud object storage 130. The stored risk assessment objects and the mapped sentences can be further processed by a computer or device connected to the network.

In another embodiment, when the risk assessment engine 150 cannot determine whether the mapped sentences include risk-associated language, the risk assessment engine 150 can consider additional information to aid in assessing the risk of the mapped sentences by locating and evaluating other sentences in the document, or data in a risk assessment database 170. The risk assessment database 170 can include risk related information that can be associated with the document. One benefit to considering the additional information is that the risk assessment engine 150 can provide a more robust risk assessment for the risk posed by the document.

After the additional information is located, the risk assessment engine 150 can implement a second machine learning process to determine a risk posed by the mapped sentences to one or more parties of the document. One way of determining the risk posed to a party involves collating, or associating, and evaluating the additional information with the mapped sentences, and generating risk assessments that correspond to the risk criterion of the risk criterion document. The risk assessments can be encapsulated as objects, or incorporated into objects, and stored with the mapped sentences or additional information in the cloud object storage 130. The stored risk assessment objects and the mapped sentences can be further processed by a computer or device connected to the network.

The system 100 for assessing the risk of a document further comprises a document annotation visualizer 140 connected to the network. In one embodiment, the document annotation visualizer 140 can be software, executed on one or more processors, used to add comments, highlighting, markings, demarcations, and the like to text in the document. For example, a user can invoke the document annotation visualizer 140 to apply a setting to highlight the text of the document that poses risk to the party. In this example, the document annotation visualizer 140 generates configuration data based on the user's input, and stores the configuration data in the cloud object storage 130.

In the illustrated embodiment, the system 100 for assessing the risk of a document further comprises a document annotation engine 160. The document annotation engine 160 can be software, executed on one or more processors, configured to receive the configuration data, the risk assessment object, and the document (or one or more mapped sentences) stored in the cloud object storage 130. In one embodiment, the document annotation engine 160 can add comments, highlighting, markings, demarcations, and the like to the document (or one or more mapped sentences) based on the configuration data. The documentation annotation engine 160 can also perform editing operations to the document or text within the document.

Figure 2:
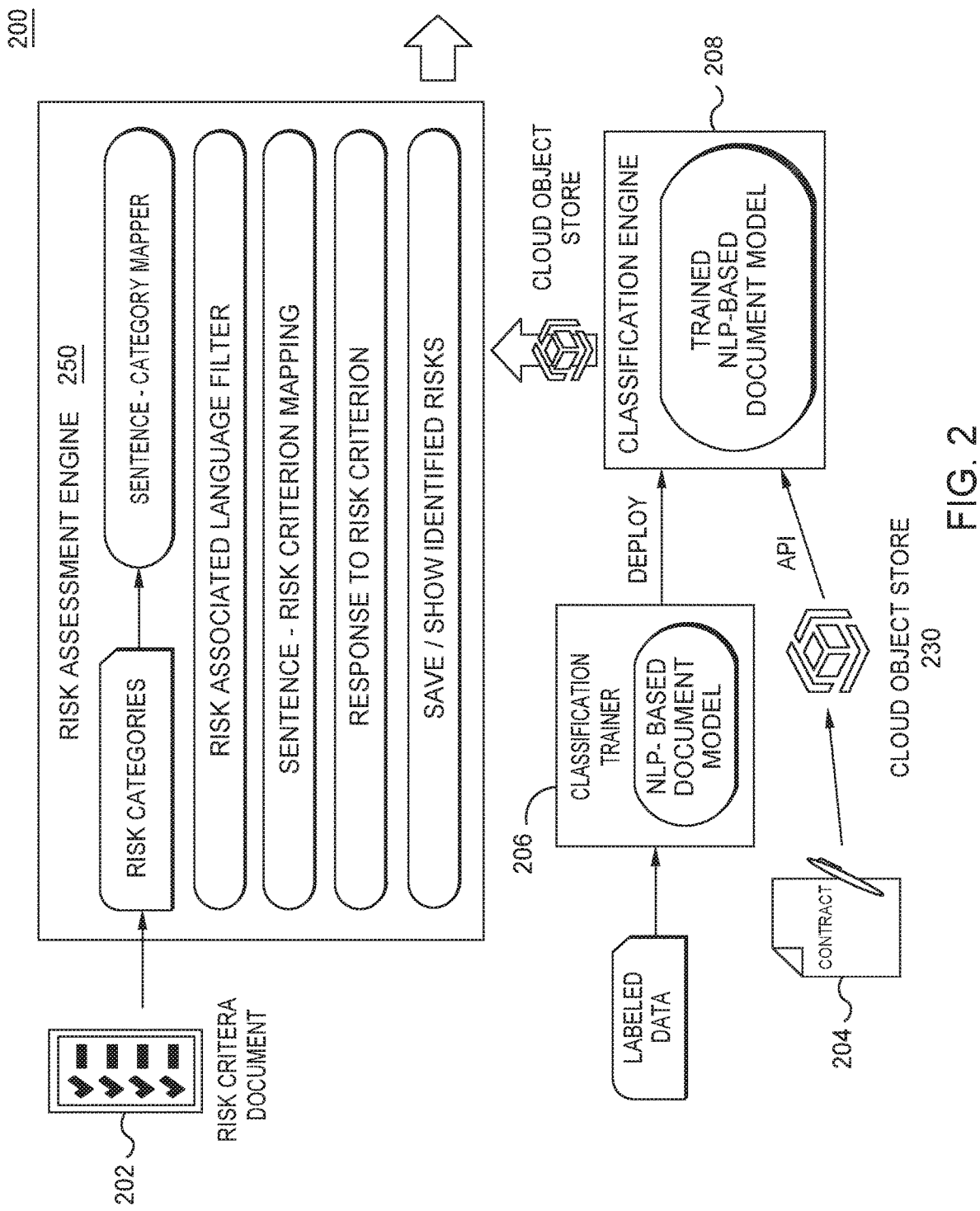
FIG. 2 illustrates a risk assessment engine system, according to one embodiment.

FIG. 2 illustrates a risk assessment engine system 200, according to one embodiment. The risk assessment engine system 200 comprises a risk assessment engine 250, which can be software, executed on one or more processors, to receive a risk criterion document 202 for the risk-assessment of a first document 204.

The risk criteria document 202 comprises one or more risk criterion concerning risk posed to at least one party of the first document 204. As a non-limiting example, the first document 204 can be a contract involving audit rights. For instance, a first sentence of the contract may be "Unless otherwise agreed, the period covered by each type of audit described in this section shall be limited to the less recent of the previous twelve (12) months of Services and Fees or the period since the last such audit was performed;" and a second sentence of the contract may be, "Company X agrees it will not conduct a software verification review with Customer for a period of 2 years from the date of this Agreement."

In this example, the risk criterion can be one or more questions concerning risks that the contract poses to at least one party of the contract. One question of the risk criterion document 202 may be, for instance, "Do non-standard audit rights exist in the contract?"

In one embodiment, the risk assessment engine 250 uses natural language processing (NLP) to analyze the risk criterion document 202, and establishes one or more risk categories based on the risk criterion. Continuing the previous example, the risk assessment engine 250 can create a risk category ("Audit") based on the question about non-standard audit rights in the risk criterion document 202. Moreover, the risk assessment engine 250 can implement NLP to map sentences of the first document 204 that are associated with auditing to the Audit category. Hence, the Audit category can reference both the first sentence and second sentence of the contract.

The first sentence of the contract includes standard language for audits. In this example, the standard language is boiler-plate language that is deemed to not pose a risk to a party of the contract. The second sentence of the contract includes non-standard language for audits. In this example, the non-standard language poses a risk to at least one party to the contract. The risk assessment engine 250 can evaluate the first and second sentences, and determine whether language therein is standard or non-standard, which is discussed in more detail below. In this instance, the risk assessment engine system 200 can identify, save, edit, or display the non-standard language posing risk to at least one party.

The risk assessment engine system 200 further comprises a classification trainer 206. The classification trainer 206 can be software, executed on one or more processors, configured to train a NLP-based document model. In one embodiment, the classification trainer 206 implements a supervised learning process to train the NLP-based document model to identify and classify risk-associated language of a document. As shown, this process involves providing labeled data to the classification trainer 206 to train, re-train, or calibrate the NLP-based categorization of the content of the first document 204.

The risk assessment engine system 200 further comprises a classification engine 208. The classification engine 208 can be software, executed on one or more processors, configured to implement the trained NLP-based document model to identify and classify risk-associated language in the document as standard or non-standard language of the contract.

In the illustrated embodiment, the classification trainer 206 deploys the trained NLP-based document model to the classification engine 208. Returning to the previous example, the risk assessment engine system 200 can identify the non-standard language of the contract by using the classification engine 208, which implements the trained NLP-based document model, to identify risk-associated language in the sentences mapped to the Audit category.

Another way the risk assessment engine system 200 identifies the non-standard language of the contract is by using the classification engine 208 to identify the standard language of the contract. Because the standard language is deemed to not pose a risk to a party of the contract, the standard language can be filtered out of the sentences referenced by the Audit category without affecting the efficacy of the risk assessment engine. Hence, the first sentence is removed from the Audit category.

The remaining second sentence, which is mapped to the Audit category, includes non-standard language that poses a risk to at least one party of the contract. Therefore, the risk assessment engine 250 can analyze the second sentence to answer the question from the risk criterion document 202. Specifically, risk assessment engine 250 can interpret the second sentence ("Company X agrees it will not conduct a software verification review with Customer for a period of 2 years from the date of this Agreement") to answer the question ("Do non-standard audit rights exist in the contract?") in the affirmative. In turn, the risk assessment engine 250 generates a corresponding response to the question, or other risk criterion of the risk criterion document 202. The response reflects a risk posed by the contract to at least one party of the contract. The risk assessment engine 250 can save or display the response in the cloud object store 230.

Figure 3:
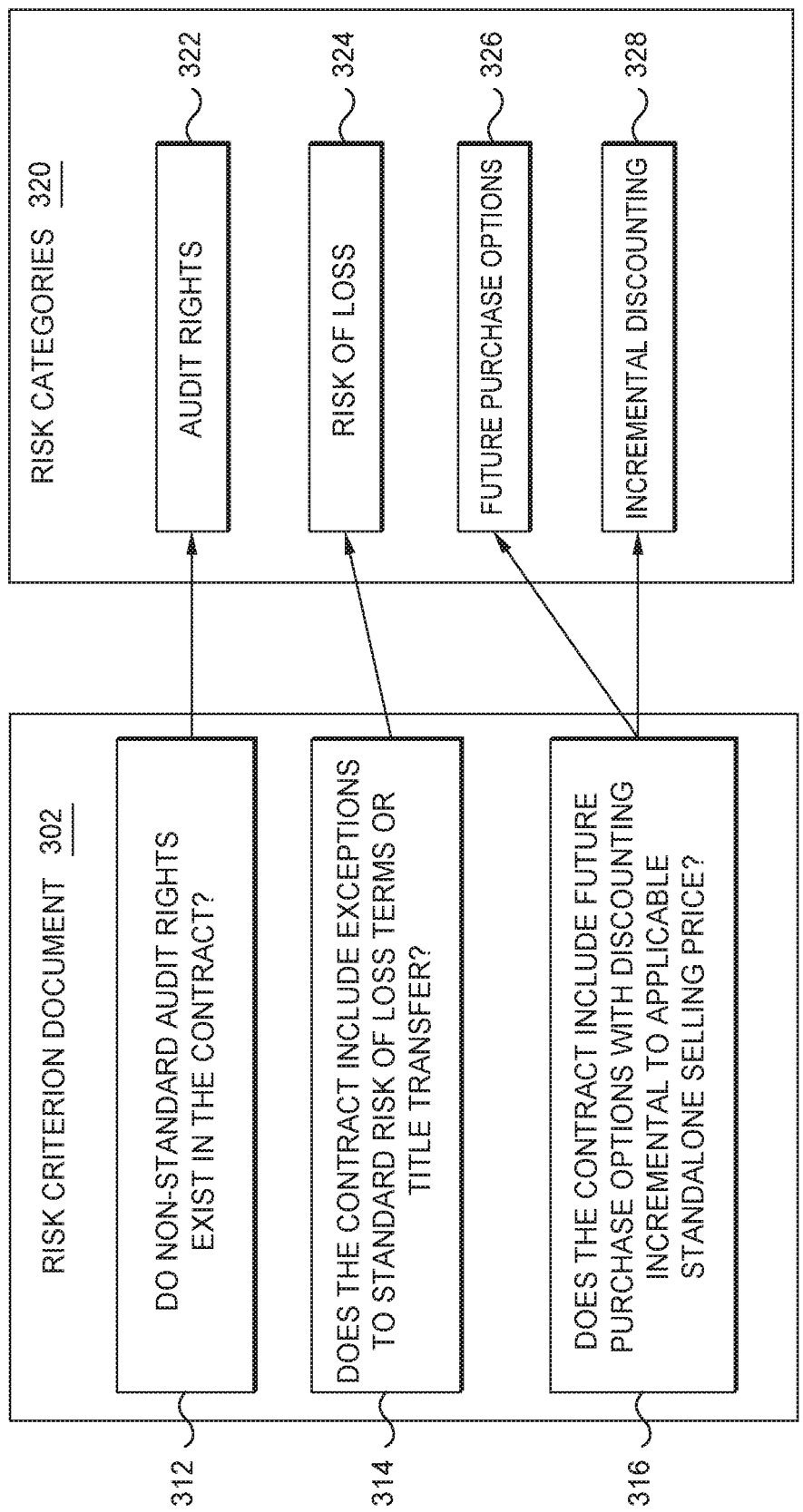
FIG. 3 illustrates a risk category system, according to one embodiment.

FIG. 3 illustrates a risk category system 300, according to one embodiment. One benefit of using risk categories for embodiments in the present disclosure is the simplification of analyzing documents for risk assessment.

The risk category system 300 comprises a risk criterion document 302 that includes one or more risk criterion, and one or more risk categories. In the illustrated embodiment, the risk criterion document 302 is depicted as a questionnaire that concerns risk posed to a party of a contract. The questionnaire can be generated by one who is familiar with potential risks posed by a first document. The risk criterion of the questionnaire are depicted as three questions associated with risk posed to a party of the contract.

The one or more risk categories 320 are created based on the risk criterion in the risk criterion document 302. For example, a first risk category 322 is created based on a first risk criterion 312. In this instance, the first risk category 322 is "Audit Rights," which captures a risk associated with the first risk criterion 312 ("Do non-standard audit rights exist in the contract?"). Further, the first risk criterion 312 can be mapped to the first risk category 322.

A second risk category 324 is created based on a second risk criterion 314. In this instance, the second risk category 324 is "Risk of Loss," which captures a risk associated with the second risk criterion 314 ("Does the contract include exceptions to standard Risk of Loss terms or title transfer?"). Further, the second risk criterion 314 can be mapped to the second risk category 324.

A third risk category 326 and a fourth risk category 328 are created based on a third risk criterion 316. In this instance, the third risk category 326 is "Future Purchase Options," and the fourth risk category 328 is "Incremental Discounting," both of which capture a risk associated with the third risk criterion 316 ("Does the contract include Future Purchase Options with discounting incremental to applicable Standalone Selling Price?"). Further, the third risk criterion 316 can be mapped to the third risk category 326 and the fourth risk category 328.

In some embodiments, single category can represent multiple risk criterion. For example, if five risk criterion of the risk criterion document 302 include language that concerns a risk of loss, then all five risk criterion can be mapped to the second risk category 324 ("Risk of Loss").

In one embodiment, the risk categories 320 are created via a manual process. For example, an operator of the risk assessment system 100 can read the risk criterion document 302, and create a risk category based on the language of a risk criterion. The risk criterion might not have large variability across different risk criterion documents, since many parties of documents are concerned with similar risks. Therefore, manual creation of the risk categories 320 typically requires only a limited creation process, even when creating categories using multiple risk criterion documents.

In another embodiment, the risk category system 300 can implement a risk assessment engine 250 to automatically create new risk categories. Moreover, after a risk category has been created for a first risk criterion document, this existing risk category can be reused for a second risk criterion document, assuming the existing risk category reflects the same risk for both the first and second risk criterion documents.

In another embodiment, the existing risk category can be modified or expanded to include nuances of risk criterion from the second risk criterion document. Such reuse and modification of existing risk categories can be used to build a library of risk categories based on all risk criterion documents for a given subject matter or topic domain.

Figure 4:
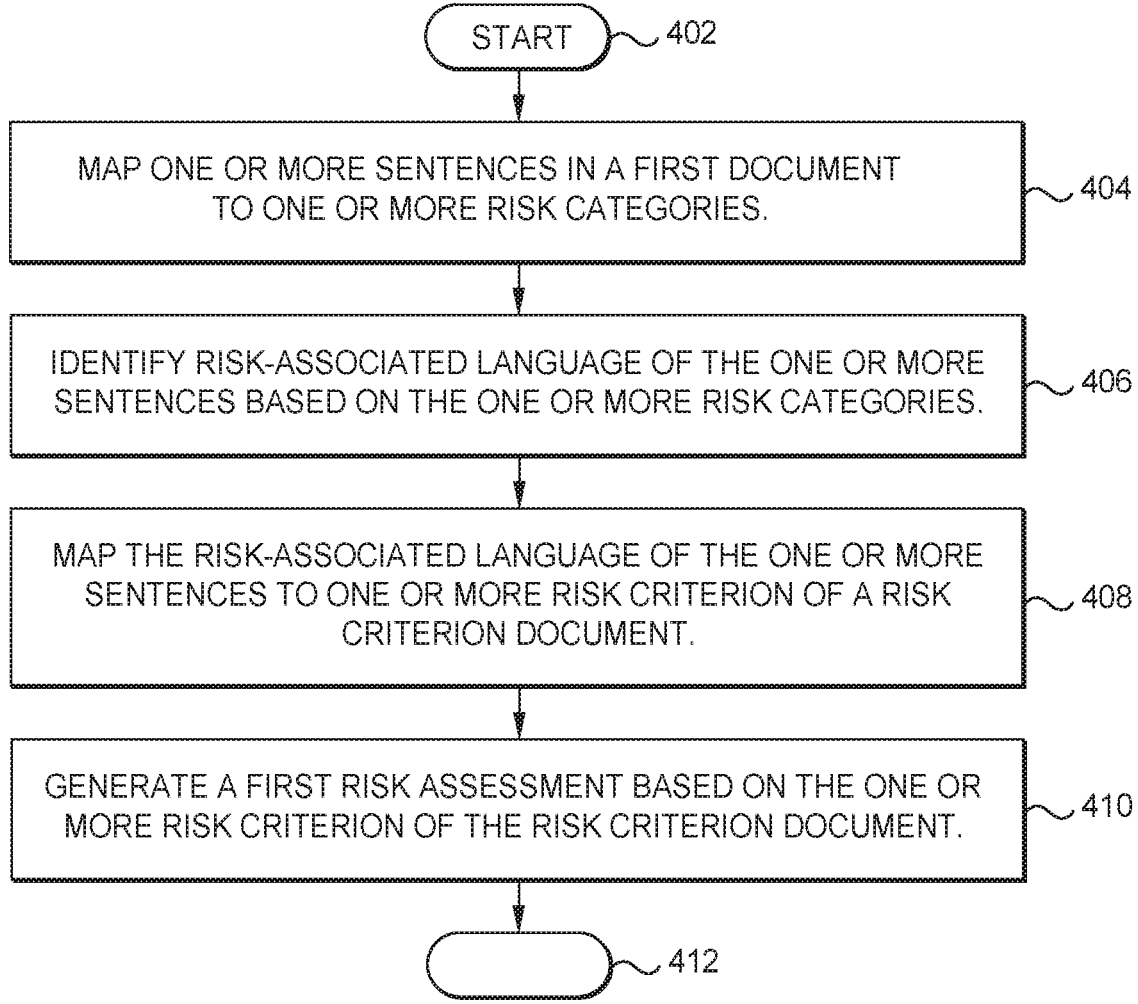
FIG. 4 depicts a flowchart of a method for assessing the risk of a document, according to one embodiment.

FIG. 4 depicts a flowchart of a method 400 for assessing the risk of a document, according to one embodiment. The method 400 begins at block 402.

At block 404, the risk assessment engine maps one or more sentences in a first document to one or more risk categories. In one embodiment, the first document can be a contract, memorandum, accounting statement, or the like. In one embodiment, the one or more risk categories are based on risk criterion in a risk criterion document, as described in FIG. 3. The risk criterion can be language that poses a potential harm to a party of the first document. The risk criterion document can be any document that can include the risk criterion, such as questionnaires, checklists, spreadsheets, and the like.

For example, the risk assessment engine can determine the risk of a contract (the first document) based on a questionnaire (the risk criterion document) comprising questions (risk criterion) about a risk concerning future purchase options to a party of the contract. In this instance, a question in the questionnaire may ask, "Does the contract include Future Purchase Options with discounting incremental to applicable Standalone Selling Price (SSP)?" Based on this question, the risk assessment engine may create a "Future Purchase Options" category, and identify sentences in the contract that are associated with future purchase options. If any such sentences are identified, they are mapped to the "Future Purchase Options" category.

In one embodiment, the risk assessment engine can map the one or more sentences to the one or more categories based on NLP-based analysis of language similarities between the sentences and risk categories. For instance, the risk assessment engine can implement NLP to identify language in the first document that is commonly associated with a category, and map sentences containing the identified language to these categories. Returning to the above example, the risk assessment engine can identify sentences containing key terms or phrases commonly associated with the "Future Purchase Option" category as belonging to the category. Afterwards, the risk assessment engine can assign the sentences containing the key terms or phrases to the category.

In another embodiment, the risk assessment engine can map the one or more sentences to the one or more categories based on the location of the one or more sentences in the first document relative to the location of language of the one or more risk categories in the first document. Returning to the above example, sentences in a first paragraph containing the terms "Future," "Purchase," or "Options," or any other language commonly associated with these terms, are more likely to be mapped to the "Future Purchase Options" category than sentences in a second paragraph, which follows the first paragraph in the contract and lacks language commonly associated with "Future Purchase Options." Sentences in the second paragraph are more likely to be mapped to the category than sentences in a third paragraph, which follows the second paragraph in the contract and lacks the language commonly associated with "Future Purchase Options."

At block 406, the risk assessment engine identifies risk-associated language of the one or more sentences based on the one or more risk categories. Although the mapped language can also include only key terms or phrases, one benefit of using one or more sentences as the mapped language is that a sentence is a relatively small language unit that can include additional context for the risk assessment engine to analyze the risk posed to a party of the first document.

The language that is considered to be risk-associated language depends on the nature of the first document. For contracts, standard or boiler-plate language is often deemed not to pose a risk to parties of the contract. In comparison, non-standard language of the contract is often language that describes a party's rights that are particular to the contract at issue, and therefore can involve significant risk to the party. In another embodiment, the risk-associated language can be any language (standard or non-standard) that is mapped to the one or more categories. Continuing the above example, the risk-associated language of the contract comprises any non-standard language associated with future purchase options.

In one embodiment, the risk assessment engine determines whether the one or more sentences comprises standard language or non-standard language via a classification engine, as described in FIG. 2. The classification engine can implement a trained NLP-based document model to classify a sentence as standard language or non-standard language.

At block 408, the risk assessment engine maps the risk-associated language of the one or more sentences to one or more risk criterion of a risk criterion document. If the risk assessment engine determines that the one or more sentences mapped to the category include at least one sentence with standard language, and at least one sentence with non-standard language, the risk assessment engine can identify and remove, or filter out, any sentence that comprises only standard language. The remaining sentences comprise the non-standard language associated with future purchase options. Therefore, the remaining sentences comprise the pertinent risk-associated language of the contract, and can be mapped to the corresponding risk criterion of the risk criterion document. Continuing the above example, the risk-associated language is mapped to the questions to allow the risk assessment engine to determine whether the question can be answered by information from risk-associated language.

At block 410, the risk assessment engine generates a first risk assessment based on the one or more risk criterion of the risk criterion document. In one embodiment, the first risk assessment indicates a mapping of risk-associated language to the one or more risk criterion. Continuing the above example, if the non-standard language is mapped to a question, then the answer (a risk assessment) to the question can indicate that there is a pertinent risk posed to a party of the contract. For instance, the risk assessment engine can generate a text, field selection, radio selection, or like to answer the question ("Does the contract include Future Purchase Options with discounting incremental to applicable Standalone Selling Price (SSP)?") in the affirmative. Otherwise, the risk assessment engine can generate a risk assessment to answer the question in the negative.

In one embodiment, the first risk assessment indicates the presence or severity of a risk posed by the one or more sentences to a party of the first document. The first risk assessment can include annotations, comments, highlighting, markings, demarcations, and the like. Continuing the above example, the first risk assessment includes an answer to the question in the questionnaire. After generating the first risk assessment, the risk assessment engine can store the first risk assessment, and deliver the first risk assessment or the first document to a computer or device for display or further risk assessment. The method 400 ends at block 412.

Figure 5:
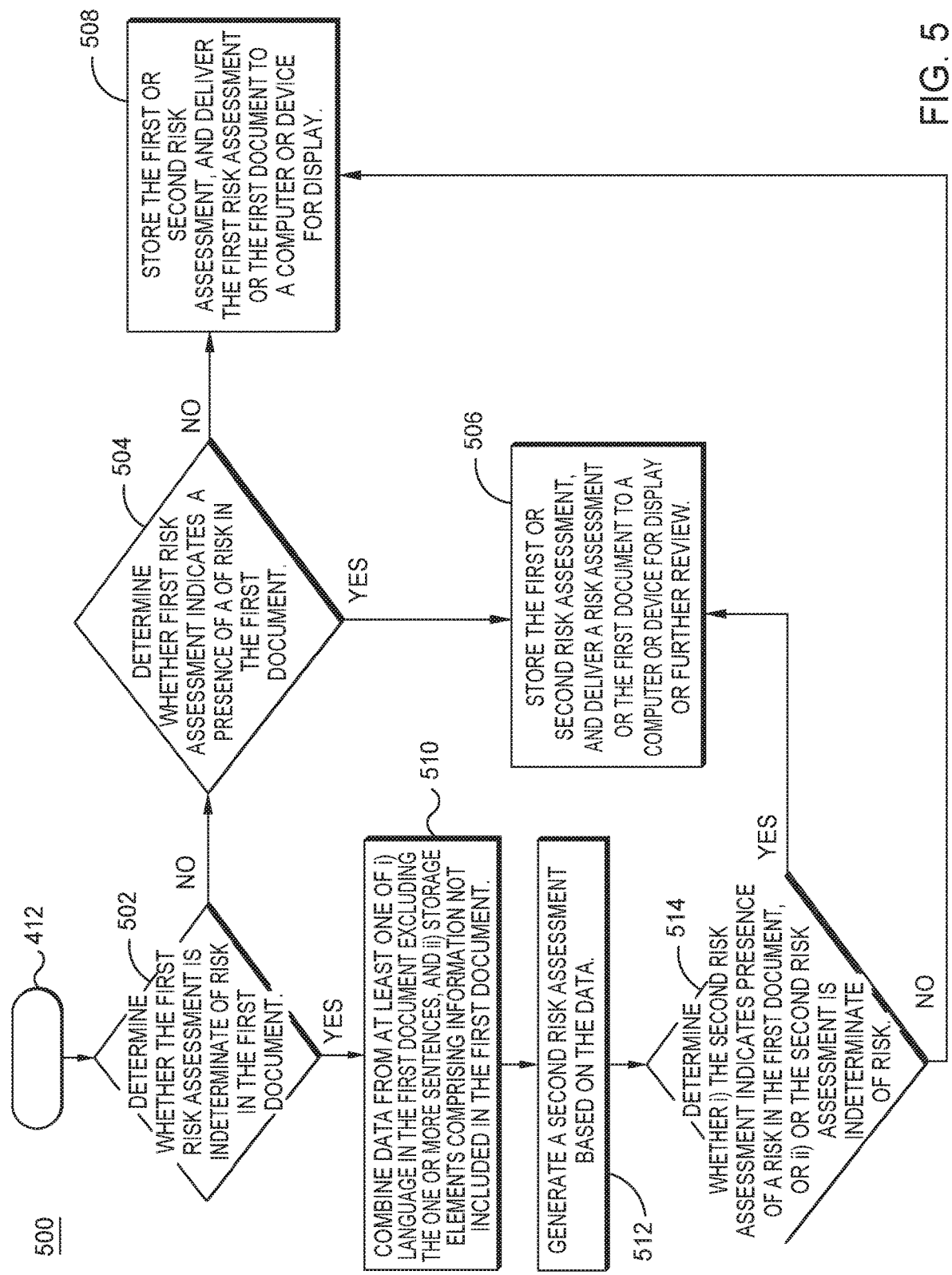
FIG. 5 depicts a flowchart of a method for assessing the risk of a document, according to one embodiment.

FIG. 5 depicts a flowchart of a method 500 for assessing the risk of a document, according to one embodiment. The method 500 can continue from block 412 of the method 400.

At block 502, the risk assessment engine determines whether the first risk assessment is indeterminate of risk in the first document. The first risk assessment can be indeterminate of risk when a risk criterion of a risk criterion document cannot be resolved. In one embodiment, if each of the risk categories has at least one sentence mapped to it, then the first document is deemed to pose a risk to at least one party of the contract, irrespective of whether the mapped sentences include standard or non-standard language.

In illustrated embodiment, the risk assessment engine determines when the risk criterion can be resolved based on metadata associated with the risk criterion document. One benefit to implementing metadata to determine when the risk criterion can be resolved is that it enables the risk assessment engine to determine when to search for additional information to determine the risk of the first document.

The metadata can be predetermined based on the risk criterion of the risk criterion document. The metadata can comprise one or more case types that indicate language or concepts from each risk criterion in the risk criterion document. The metadata can further comprise one or more answer factors that correspond to the one or more case types. Each answer factor can indicate an amount of sentences that should be associated with the corresponding case type, or an external search process, to resolve the risk criterion. If the answer factor for the corresponding case type is satisfied, then the risk criterion corresponding to the case type can be deemed resolved, and the first risk assessment can be deemed as not being indeterminate of risk. Otherwise, the risk criterion corresponding to the case type can be deemed unresolved, and the first risk assessment can be deemed as indeterminate of risk.

For instance, the metadata can include case types I, II, and III. Case type I may include an answer factor that requires at least one sentence from the first document to be associated with the case type. Hence, for a risk criterion such as "Do non-standard audit rights exist in the contract," case type I may include an answer factor that is satisfied if one sentence from a document indicates language or concepts associated with "non-standard audit rights." Given a case type I, the risk assessment engine can determine whether the answer factor is satisfied based on the presence of the one or more sentences of the first document that were mapped to either a risk category or a risk criterion.

Case type II may include an answer factor that requires multiple sentences to be mapped to the case type. Hence, for a risk criterion such as "Does the contract include exceptions to standard risk of loss terms or title transfer," case type II may include an answer factor that is satisfied if one sentence from the document indicates language or concepts associated with "standard risk of loss," and two sentences from the document indicate language or concepts associated with "title transfer." Given a case type II, the risk assessment engine can determine whether the answer factor is satisfied based on the presence of the sentences of the first document that were mapped to either a risk category or a risk criterion. The risk assessment engine can also determine whether the answer factor is satisfied by using an NLP-based model to search the first document for the language or concepts associated with "standard risk of loss" and "title transfer."

Case type III may include an answer factor that requires external data to be mapped to the case type. Hence, for a risk criterion such as "Does the contract include future purchase options with discounting incremental to applicable standalone selling price," case type III may include an answer factor that requires an external search process in which the risk assessment engine retrieves information associated with the first document from sources aside from the first document. This process is discussed further below. Given a case type III, the risk assessment engine can determine whether the answer factor is satisfied based on the information gathered from the external search process, and based on i) the presence of the sentences of the first document that were mapped to either a risk category or a risk criterion or ii) information from using an NLP-based model to search the first document for the language or concepts associated with "future purchase options," or "incremental discounting."

If the first risk assessment is not indeterminate of risk, the method 500 proceeds to block 504. At block 504, the risk assessment engine determines whether first risk assessment indicates a presence of a risk in the first document. If the first risk assessment does not indicate the presence of a risk in the first document, then the method 500 proceeds to block 508, where the risk assessment engine stores the first risk assessment, and delivers the first risk assessment or the first document to a computer or device for display.

Returning to block 504, if the first risk assessment does indicate the presence of a risk in the first document, the method proceeds to block 506. At block 506, the risk assessment engine can store the first risk assessment, and deliver the first risk assessment or the first document to a computer or device for display or further risk assessment. The further risk assessment may be an audit or review performed by a person.

Returning to block 502, if the first risk assessment is indeterminate of risk, then the method 500 proceeds to block 510. At block 510, the risk assessment engine combines data from at least one of i) language in the first document excluding the one or more sentences, and ii) storage elements comprising information not included in the first document.

Continuing the above example, assume that the risk assessment engine created "Future purchase options" and "incremental discounting" categories from the question. If the risk assessment engine locates future purchase option language in the contract, but cannot locate information about the standalone selling price, or about incremental discounting, then the risk assessment engine cannot presently answer the question in the questionnaire. In an alternate scenario, if the risk assessment engine receives metadata including case type III, then the risk assessment engine cannot presently answer the question in the questionnaire.

In these instances, the risk assessment engine can query an external storage element (such as a database or software representation of data) for data associated with the standalone selling price or incremental discounting, or for more information related to the future purchase options. The risk assessment engine can then attempt to answer the question based on any such received data.

At block 512, the risk assessment engine generates a second risk assessment based on the data. At block 514, the risk assessment engine determines whether i) the second risk assessment indicates presence of a risk in the document, or iii) or the second risk assessment is indeterminate of risk.

If the second risk assessment indicates the presence of a risk or is indeterminate of risk, then the method 500 proceeds to block 506. At block 506, the risk assessment engine can store the second risk assessment, and deliver the second risk assessment or the first document to a computer or device for display or further risk assessment. The further risk assessment may be an audit or review performed by a person.

If the second risk assessment does not indicate the presence of a risk, then the risk assessment engine stores the second risk assessment, and delivers the second risk assessment or the first document to a computer or device for display. The method 500 then proceeds to its end at block 508.

Figure 6:
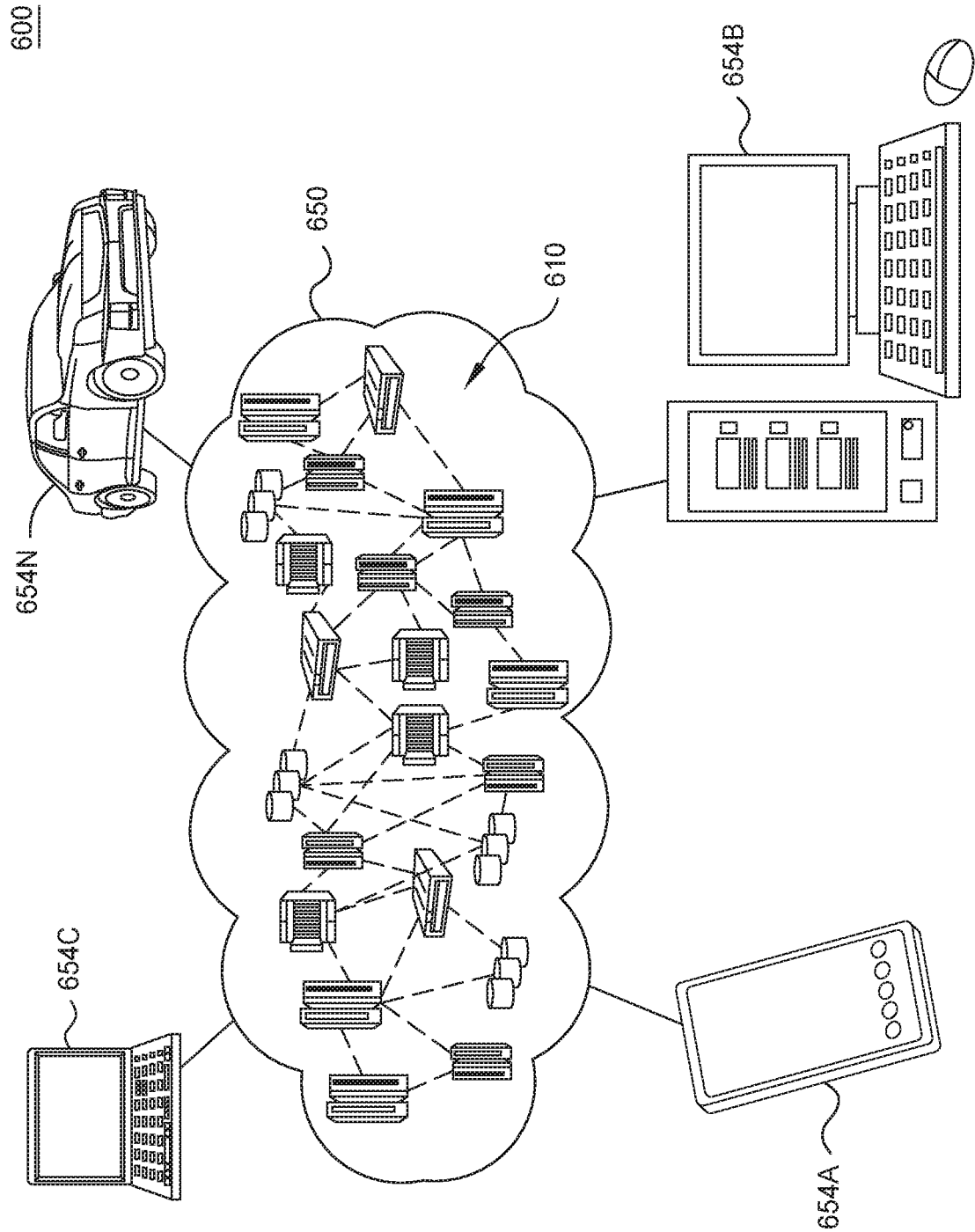
FIG. 6 depicts a cloud computing environment according to an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
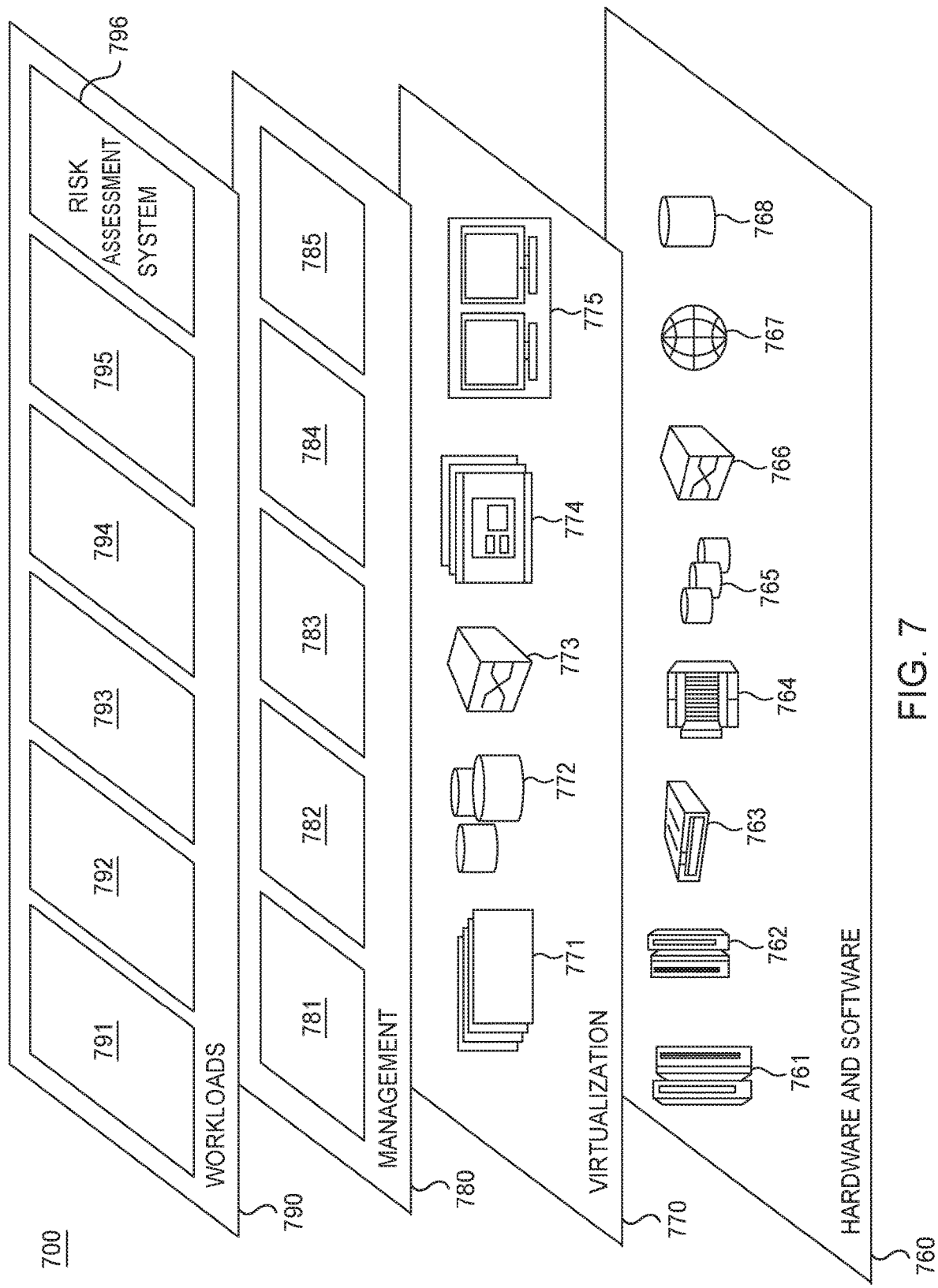
FIG. 7 depicts abstraction model layers according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and a risk assessment system 796.

In one embodiment, the risk assessment system 796 comprises a risk assessment engine and cloud document storage. The cloud document storage can comprise any combination of elements in the hardware and software layer 760 and the virtualization layer 770.

A user can access the user portal 783 to upload a first document and a risk criterion document to the cloud document storage. The cloud document storage can also store a risk assessment generated by the risk assessment engine. The risk assessment engine can determine a risk posed by the first document to at least one party of the first document, as described in various embodiments of the present disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

What is claimed is:

1. A computer-implemented method comprising:
   training a machine learning (ML) model to perform natural language processing to classify one or more portions of contractual documents as standard or non-standard contractual clauses, using training data;
   mapping, via a risk assessment engine using one or more computer processors, one or more sentences in a first contractual document to one or more risk categories associated with a type of risk posed by the first contractual document, the one or more risk categories relating to a risk to a party to the first contractual document;
   identifying, via a classification engine using at least one of the one or more computer processors, risk-associated language of the one or more sentences based on the one or more risk categories, comprising:
      identifying a non-standard contractual clause in the first contractual document using the trained ML model, based on determining that the non-standard contractual clause comprises language that is not standard for a contractual document; and
      removing standard language of the one or more sentences based on the one or more risk categories;
   mapping, via the risk assessment engine using the one or more computer processors, the risk-associated language of the one or more sentences to one or more risk criterion of a risk criterion document;
   generating, via the risk assessment engine using the one or more computer processors, a first risk assessment based on the one or more risk criterion of the risk criterion document; and
   delivering the first risk assessment for presentation to a user using a user interface.

2. The method of claim 1, wherein the one or more risk categories are based on the risk criterion document.

3. The method of claim 1, further comprising:
   determining that the first risk assessment is indeterminate of risk;
   combining data from at least one of i) language in the first contractual document excluding the one or more sentences, and ii) storage elements comprising information not included in the first contractual document; and
   generating a second risk assessment based on the data.

4. The method of claim 3, wherein the data is combined based on metadata associated with the risk criterion document.

5. The method of claim 4, further comprising:
   determining at least one of i) the first risk assessment indicates presence of a risk in the first contractual document, ii) the second risk assessment indicates presence of a risk in the first contractual document, and iii) the second risk assessment is indeterminate of risk, and
   dispatching the first contractual document and the first or second risk assessment to a computer or device.

6. A system for assessing risk, comprising a risk assessment engine configured to use one or more computer processors to:
- train a machine learning (ML) model to perform natural language processing to classify one or more portions of contractual documents as standard or non-standard contractual clauses, using training data;
- map, by the one or more computer processors, one or more sentences in a first contractual document to one or more risk categories associated with a type of risk posed by the first contractual document, the one or more risk categories relating to a risk to a party to the first contractual document;
- identify, by the one or more computer processors, risk-associated language of the one or more sentences based on the one or more risk categories, comprising:
  - identifying a non-standard contractual clause in the first contractual document using the trained ML model, based on determining that the non-standard contractual clause comprises language that is not standard for a contractual document;
- map, by the one or more computer processors, the risk-associated language of the one or more sentences to one or more risk criterion of a risk criterion document;
- generate, by the one or more computer processors, a first risk assessment based on the one or more risk criterion of the risk criterion document;
- determine, by the one or more computer processors, that the first risk assessment is indeterminate of risk;
- combine, by the one or more computer processors, data from at least one of i) language in the first contractual document excluding the one or more sentences, and ii) storage elements comprising information not included in the first contractual document;
- generate, by the one or more computer processors, a second risk assessment based on the data; and
- deliver, by the one or more computer processors, the second risk assessment for presentation to a user using a user interface.

7. The system of claim 6, wherein the one or more risk categories are based on the risk criterion document.

8. The system of claim 6, wherein the risk-associated language of the one or more sentences is identified by removing standard language of the one or more sentences based on the one or more risk categories.

9. The system of claim 6, wherein the data is combined based on metadata associated with the risk criterion document.

10. The system of claim 9, wherein the risk assessment engine is further configured to:
- determine at least one of one of i) the first risk assessment indicates presence of a risk in the first contractual document, ii) the second risk assessment indicates presence of a risk in the first contractual document, and iii) the second risk assessment is indeterminate of risk, and
- dispatch the first contractual document and the first or second risk assessment to a computer or device.

11. A computer-readable storage medium including computer program code that, when executed on one or more computer processors, performs an operation configured to:
- train a machine learning (ML) model to perform natural language processing to classify one or more portions of contractual documents as standard or non-standard contractual clauses, using training data;
- map one or more sentences in a first contractual document to one or more risk categories associated with a type of risk posed by the first contractual document, the one or more risk categories relating to a risk to a party to the first contractual document;
- identify risk-associated language of the one or more sentences based on the one or more risk categories, comprising:
  - identifying a non-standard contractual clause in the first contractual document using the trained ML model, based on determining that the non-standard contractual clause comprises language that is not standard for a contractual document; and
  - removing standard language of the one or more sentences based on the one or more risk categories;
- map the risk-associated language of the one or more sentences to one or more risk criterion of a risk criterion document;
- generate a first risk assessment based on the one or more risk criterion of the risk criterion document; and
- deliver the first risk assessment for presentation to a user using a user interface.

12. The computer-readable storage medium of claim 11, wherein the one or more risk categories are based on the risk criterion document.

13. The computer-readable storage medium of claim 11, the operation further configured to:
- determine that the first risk assessment is indeterminate of risk;
- combine data from at least one of i) language in the first contractual document excluding the one or more sentences, and ii) storage elements comprising information not included in the first contractual document; and
- generate a second risk assessment based on the data.

14. The computer-readable storage medium of claim 13, the operation further configured to:
- determine at least one of one of i) the first risk assessment indicates presence of a risk in the first contractual document, ii) the second risk assessment indicates presence of a risk in the first contractual document, and iii) the second risk assessment is indeterminate of risk, and
- dispatch the first contractual document and the first or second risk assessment to a computer or device.

* * * * *